INVENTOR.
GEORGE R. LEGHORN
BY
Lynn N. Latta
ATTORNEY

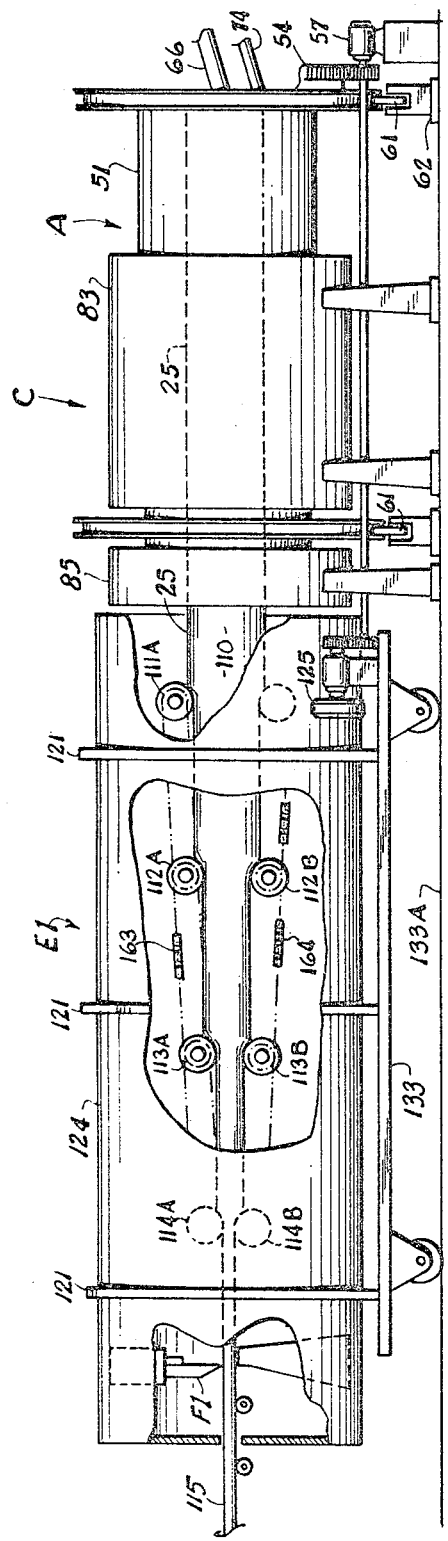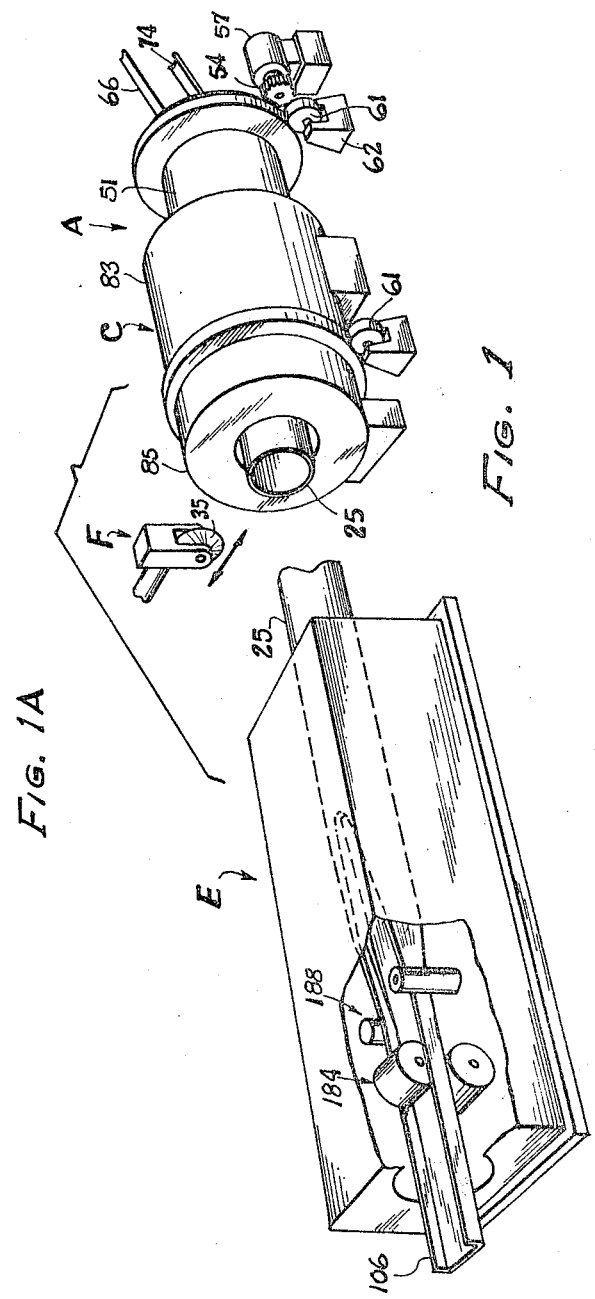
FIG. 1A
FIG. 1
INVENTOR.
GEORGE R. LEGHORN
BY Lynn K. Latta
ATTORNEY

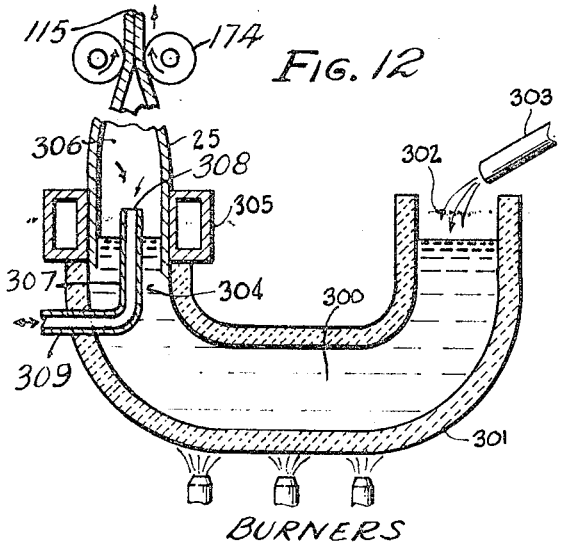
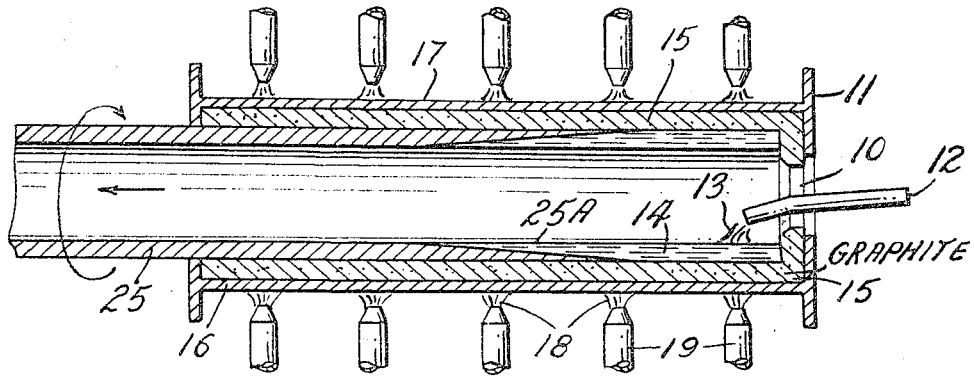
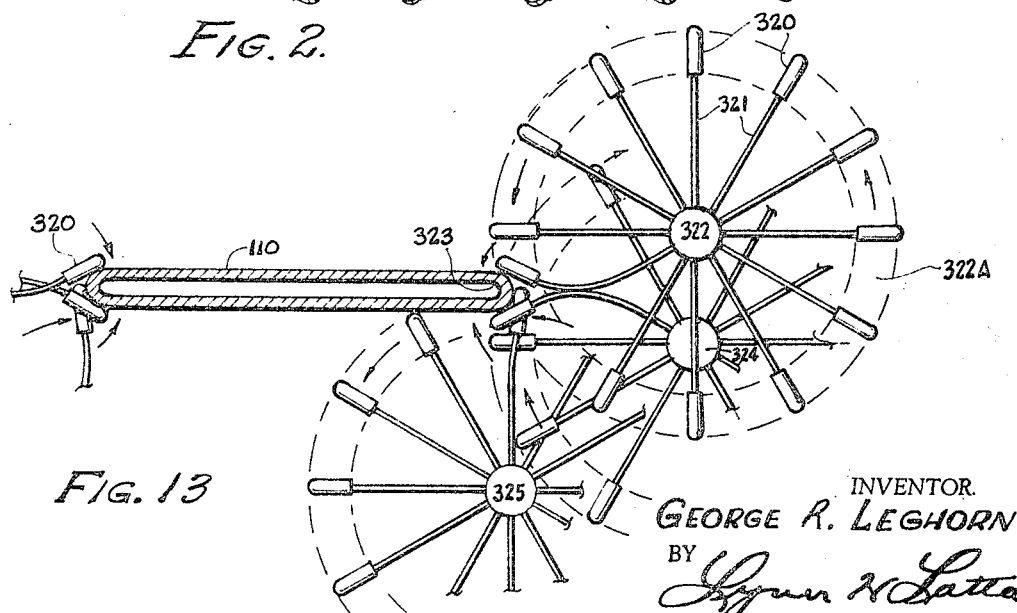

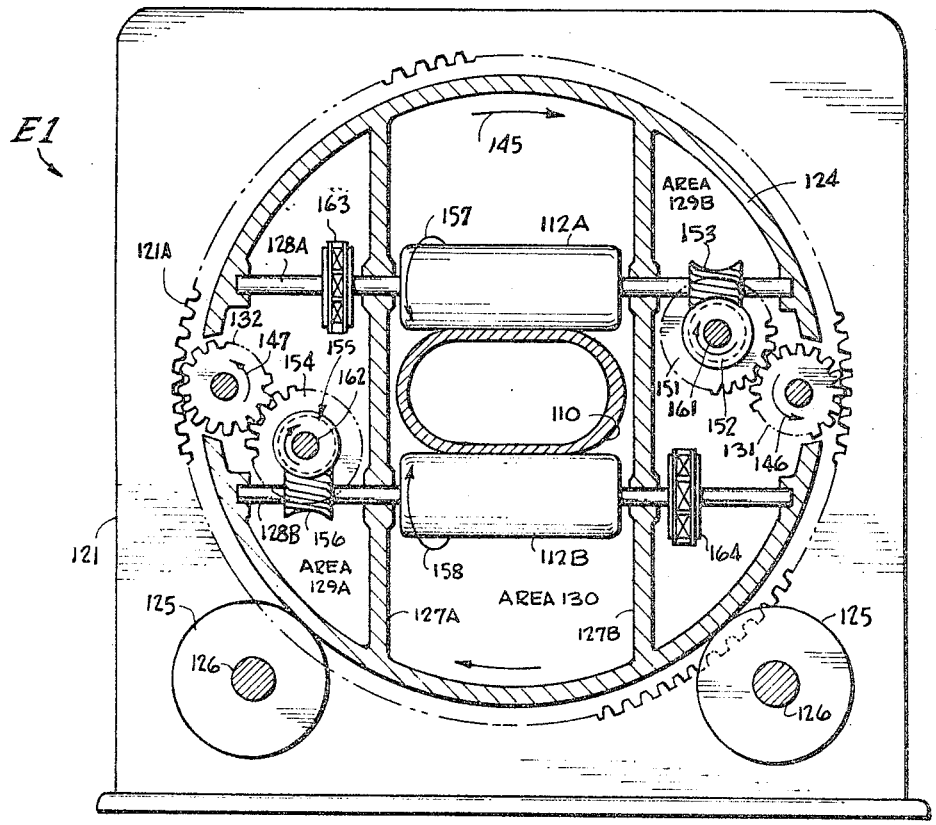
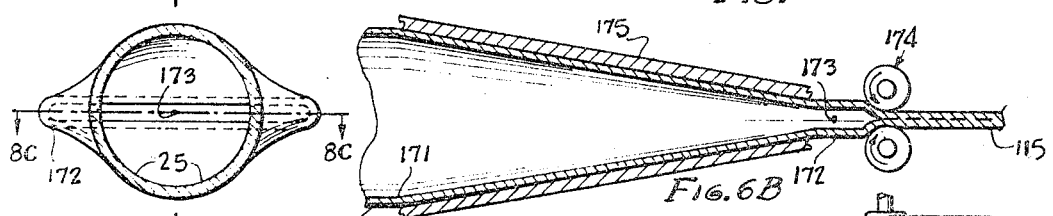
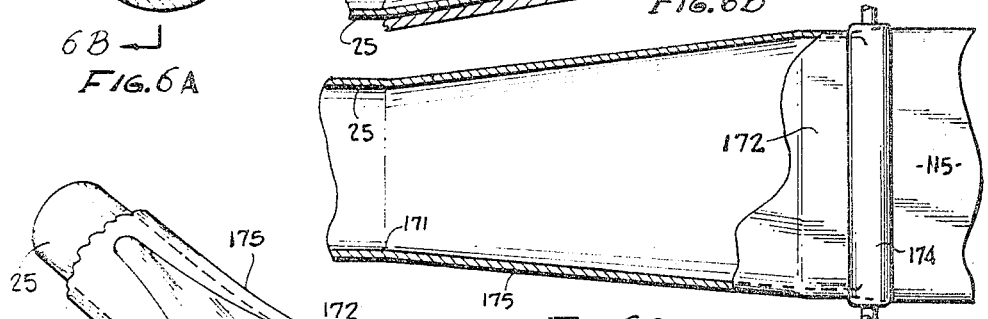

May 27, 1969 G. R. LEGHORN 3,445,922
METHOD AND APPARATUS FOR THE FORMING OF LONGITUDINAL
STRUCTURAL SHAPES FROM CAST TUBE
Filed Feb. 11, 1966 Sheet 5 of 6

INVENTOR.
GEORGE R. LEGHORN
BY
Lynn H. Latta
ATTORNEY

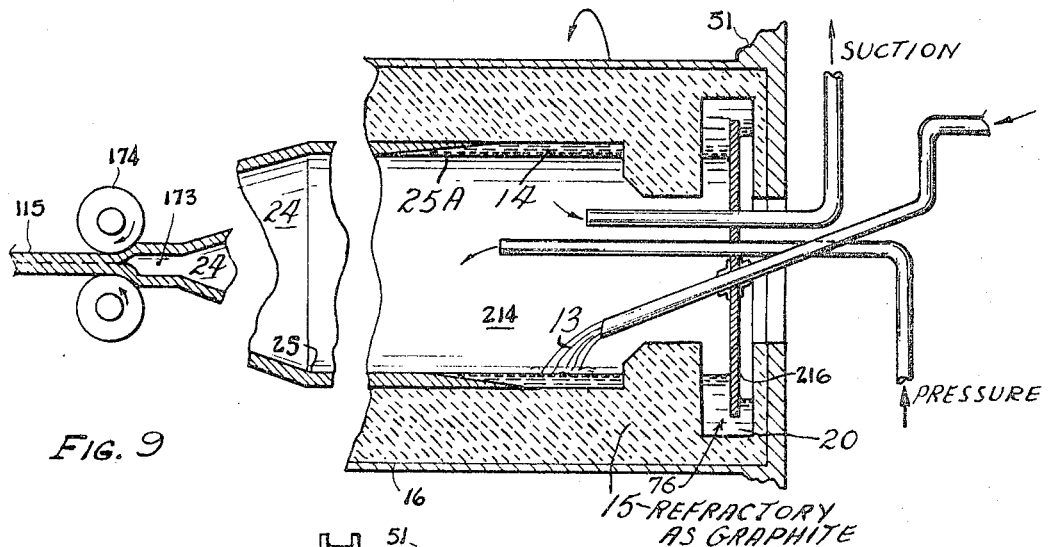
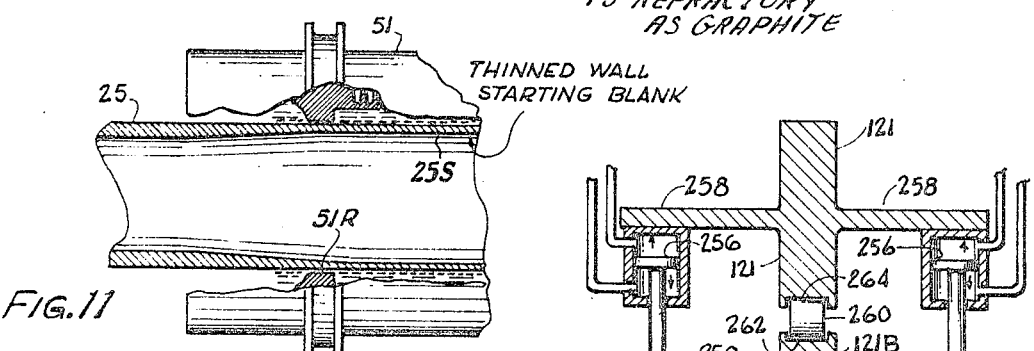
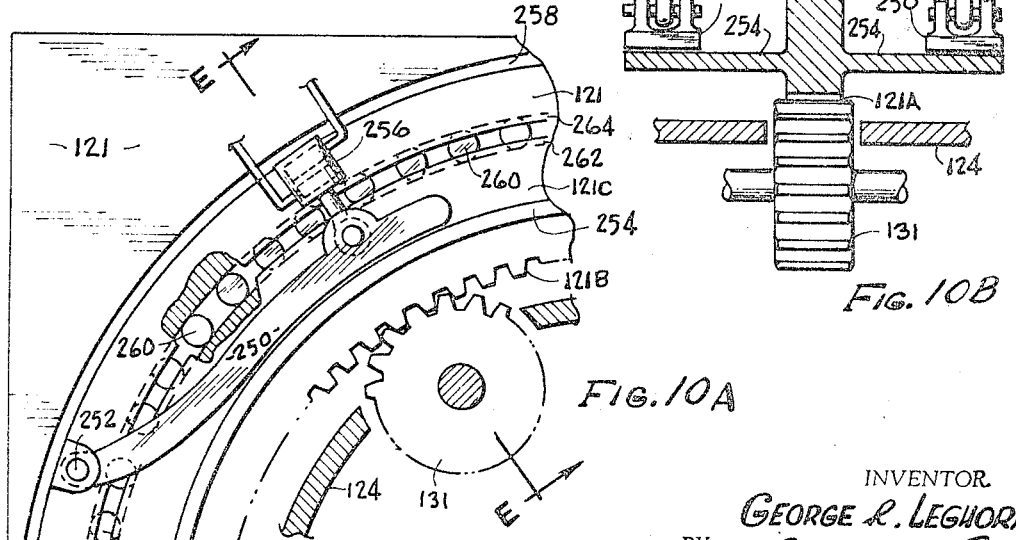

United States Patent Office 3,445,922
Patented May 27, 1969

3,445,922
METHOD AND APPARATUS FOR THE FORMING OF LONGITUDINAL STRUCTURAL SHAPES FROM CAST TUBE
George A. Leghorn, 1027 20th St., Santa Monica, Calif. 90403
Filed Feb. 11, 1966, Ser. No. 538,506
Int. Cl. B23p 17/00; B21d 5/08, 51/00
U.S. Cl. 29—527.6     30 Claims

ABSTRACT OF THE DISCLOSURE

The forming a structural members such as I-beams, channels, plates and the like wherein a tubular section is first formed by a suitable process (e.g. by centrifugal casting) and such tubular section is then collapsed to form the selected structural section.

SUMMARY OF INVENTION

In general, the invention provides a method whereby discrete lengths of cast tube are brought to, or maintained at a temperature suitable for deformation thereof to form a longitudinal structural shape (as plate, angles, channels, I-beam, railroad rails, etc. having the same cross-section over its entire length) by inwardly collapsing the tube walls into contiguous inner contact and the desired structural item's cross-section and thereafter, are deformed (as by rolling) to a finished size with incipient or complete welding of the contiguous surfaces one to the other.

The teachings of the invention further encompass the method(s) of achieving the collapse deformation of such tube as it continuously exits from the tube casting means (whether of a non-rotating or rotating nature) since this has the advantage of continuity and permits greater economies by maintaining and utilizing, to a large extent, the heat residual within the tube material from the tube-casting means.

BACKGROUND OF INVENTION

At present, there are many known techniques for casting matter, such as metals, into sections of different shapes and cross-sections. Generally, the metals are cast into solid billets of square or rectangular cross-section which are then deformed into different structural shapes such as I-beams, U-shaped channels, pipes, rail and the like. The equipment needed in employing such techniques is very complex and expensive since in addition to the casting machinery, powerful metal deforming equipment is required. Historically, such longitudinal structural items have been made from ingot which were rolled to the solid billets of the desired cross-sectional size prior to sequential rolling to the final shape (as a railroad rail). Currently, the roll reduction of large ingots to billets is being obviated to a large extent by the introduction of continuous casting techniques by which billets issue directly from the casting mold. Such solid billets still require heavy rolling mills for reduction to the desired cross-sectional shape and, to date, only relatively thick slabs of steel (for rolling to plate and sheet) have been continuously cast. More than this, in the continuous casting of metals, heat abstraction in the mold depends on the area of mold wall contact and the volume of metal encompassed within the contact area. In a cylindrical billet, the area of mold-wall contact is proportional to the radius of the cylinder while the volume of metal contained within this area is proportional to the square of the radius. This disproportionate increase of metal volume over the cooling contact with the mold-wall can result in a limiting restriction on the cross-sectional size of the billet produced. This restriction does not apply to tube wherein the volume of the metal being continuously cast is dependent on the radius of the tube and the wall thickness of the tube. A far more favorable ratio of mold-wall contact area to the volume of metal being continuously cast accrues where tube is the product of continuous and mechanized casting.

Continuously cast tube has an added advantage over solid ingots and continuously cast billets inasmuch as the initially solidified metal or external shell of the solid billet has a finer grain structure than the interior or core metal and is almost totally free of dendritic growth and chemical segregation which necessitate roll reduction ratios of as much as six to one to assure sound metallurgical properties in the finished product when produced from a solid casting. It can be appreciated that a cast tube is essentially the shell material and, as such, great metallurgical integrity can be attained in a finished structural item with a minimum of cross-sectional reduction. Instead of six to one or four to one rolling ratios, a mere sizing pass is usually adequate to assure the metallurgical integrity of a structure which is formed from tube by the teachings of this invention.

Centrifugally cast tube is the preferred tubular item to be formed to a longitudinal structural shape by the collapse deformation thereof since, as a result of the centrifuging action during the tube making step, the non-metallic inclusions within the metal are forced away from the exterior surface and are concentrated towards the interior surface. This, in the collapse forming of a longitudinal structural item (such as plate), the exterior surface of the structure is almost entirely free of defects resulting from such inclusions. This is particularly advantageous in the production of sheet steel for the automotive industry since surface blemishes resulting from inclusions are the primary cause of sheet rejection. Also, such longitudinal structures as beams, when subject to bending loads, endure the greatest tensile stresses in the surface layers and the integrity of such highly stressed layers is greatly improved by an absence of inclusion-produced defects. Further, centrifugal casting of tube is generally carried out at rotational speeds that create 40 to 80 gravities of radial force (one pound of metal being so cast would effectively weigh 40 to 80 pounds during centrifuging) and, as a result, the pressure-cast material has a density of structure (freedom from blowholes and gas porosity) that is equal to or greater than that of wrought metal.

It is, therefore, the intent of this invention to utilize cast tube (with its superior metallurgical properties) as a basic item for the production of longitudinal structural shapes by the collapse-forming thereof to the desired cross-section and to cause incipient or complete welding of the contiguous inwardly-folded surfaces during the shaping and sizing operations necessary to the finalized product.

Tube availability

A great many processes have been patented or are known to exist for the economical production of tubing suitable for the methods of this invention. Generally, these economical means fall into the categories of non-centrifugal and centrifugal tube casting. The centrifugal casting of tube can be further broken down into dry-wall and liquid-wall molds for centrifugal casting.

In non-centrifugal continuous casting, several processes exist of which the most exemplary seem to be the Russian "Inverted Casting" process and the Bohler Process. In both of these processes, the molten metal is poured at floor level and the continuously cast tube exists upwardly for cut-off. Both processes utilize dry-wall molds.

Centrifugal casting is done in both the vertical and horizontal positions and the horizontal types are preferred as tube-producing means since the molten metal is poured and the cast tube exists at floor level.

Dry-wall mold continuous centrifugal casting of tube is best exemplified by U.S. Patent 1,864,270 issued to R. H. Eurich et al. (a horizontal mechanized semi-continuous type process) and Patent Number 984,053 issued in Great Britain.

Dry-wall machines have an inherent disadvantage of high wear rates due to the radial forces resulting from the centrifugal action. However, mold linings of the high density, impervious graphites now used in the nuclear and rocket fields and, also, linings of the refractory metals such as molybdenum greatly ameliorate this problem. In order to further obviate the wear problem, liquid-wall mold or lubricated wall mold centrifugal casting machines are known and are best illustrated by Patent Number 22,708 issued in Great Britain to Hiram and Hudson Maxim in 1895. A more effective means is divulged in United States Patent 2,940,143 issued to Daubersy et al. wherein liquid lead is utilized as a mold wall lubricant.

The foregoing are illustrative of some twenty continuous tube casting means and best exemplified those which can be utilized to economic advantage in the methods of the invention herein disclosed.

THE PRIOR ART

Longitudinal structural member

Longitudinal structural members (as plate, T-beam, H-beams, channels, rails, etc.) have been and are conventionally formed by sequential rolling from solid ingots and billets. Also, production of longitudinal shapes is carried out by extrusion. In the extrusion of steel shapes, molten (highly viscous) glass is used as a die lubricant. Some nonstandard shapes (as special I-beams) are made by flame cutting strips from plate steel and longitudinally welding the strips together to achieve the desired cross-section (as I-beam).

In a few instances, a circular ring is centrifugally cast to a near desired cross-section. The ring is then removed from the mold, cut at some point on its periphery, straightened, and rolled to the final desired shape and size. These processes are best illustrated by U.S. Patent 1,540,558 wherein railroad rails are so formed.

A number of special methods have been patented for the fabrication of longitudinal beam shapes. These are best illustrated by U.S. Patent 2,172,806 wherein an I-beam is fabricated by capping the edges of a long heavy strip by T-sections formed by the folding of plate stock. A similar method is utilized in U.S. Patent 2,376,574 except that the T-shaped caps are formed by extruding a saw-horse type cross-section of the desired length. The longer legs of the saw-horse shape are then bent upwardly to form a planar base member while the shorter extensions crimp inwardly onto the web plate of the beam. U.S. Uatent 2,201,071 splits a large I-beam longitudinally down the center of the web section, and then weld-attaches the severed sections (after insertion of a wide strip between them) to form an I-beam with a much wider web section.

All of the foregoing conventional and special processes (as well as those not mentioned herein) require a great many sequential operations utilizing exceptionally heavy rolling mills and large power consumption. The capital investment is such that these mills only exist at relatively strategic locations.

The method of fabrication for longitudinal structural shapes herein disclosed achieves the same or superior results with rolling mills light enough to permit their being enclosed in a large tubular structure and rotated about the axis of output of the item being formed, if so desired. Such light equipment with a greatly decreased power consumption can result in the economic relocation of such forming mills at many widespread market sites.

Utilization of tube to form useful items of commerce

The remarkable versatility of tubing as a basic shape from which to form other useful items and the ingenuity of mankind are illustrated by the existence of over a hundred patents wherein tube is used.

Such utilization often concerns the mere changing (by sequential rolling steps) of the tube shape to another desired cross-section configuration. The many types (which utilize practically all deforming means such as swaging, drawing, hammering, rolling, etc.) are best illustrated by Patent 940,863 issued to Babcock and Wilcox Ltd., 1963, in Great Britain. Herein, the tubular starting blank is sequentially rolled to a tube of lenticular cross-section.

Tube has also been converted to plate by the expedient of slitting an extruded tube, opening it to a partial flat and rolling the flat stock to a thinner plate or sheet. Eight United States patents and one in Great Britain have been issued on various facets of converting tube to flat-stock by this means. This method is well exemplified by the latest of these patents (U.S. Patent 2,827,994) issued to Grossu in 1958.

U.S. Patent 3,274,681 issued to Lohman in 1966 is illustrative of processes wherein a tube or hollow casting is filled with core metal (as by insertion of a solid rod or filling with cast metal) to form a solid bimetallic rod or billet which is subsequently rolled to clad stock.

A great many patents have been issued on various methods and configurations wherein the interior of a tube (or tubes) is coated with a parting compound to prevent welding of the interior surfaces. Such tubing is then flattened and re-expanded to tubing of a different cross-section. Many complicated configurations of multiple-walled and finned tube (primarily for use in heat-exchange systems) have resulted from the application of this technique. Many of these later patents have been issued to Fromson and are well illustrated by the teachings and prior art references of U.S. Patent 2,828,533, "Method for Making Integral Sheet and Tubing Products."

Tubing has been deformed for use as items of structure and the several patents in this area are illustrated by U.S. Patent 1,722,671 which teaches the removal of a longitudinal V-section from a large tube and rejoining the edges of the tube for use as a tapered column. Another such patent, U.S. 3,120,493 "Method of Manufacture of Light-Weight Structural Members" teaches the crimping of a tube at increments along its length and then bending the tube, at the crimps, to form a zig-zag girder of light weight. A great many other configurations (such as Bourdon tubes and Venetian blind slats) have been fabricated by longitudinal collapse of thin walled tubes. In none of the prior art have the interior contiguous surfaces been welded one to the other and none of the prior art teaches or claims the longitudinal collapse deformation of tube to a double walled structural item such as plate, I-beam, channels, angles, railroad rails, etc. More than this, it has not been a practice of the prior art.

The methods (sequential rolling, use of draw or ironing dies, pressing, hammering, etc.) utilized to effect the transformation of solid billets to longitudinal structural items are well known to the art and will not be detailed in this invention's disclosure. It is sufficient to note that rolling mills are used for the major production of such structural items since such mills exhibit great versatility for the sequential deformation and cross-sectional reductions necessary for transformation of a solid billet or slab to the final longitudinal structural product. It is re-emphasized that the longitudinal collapse deformation of cast tube requires very modest force compared to the task of transforming a solid billet to a desired cross-sectional configuration and, at the same time reducing the cross-sectional area by at least four to one to assure the metallurgical and mechanical integrity (break up any dendritic structure, decrease segregation, and seal blowholes and gas porosity) of the final product.

A longitudinal structural item formed by the inward collapse of hot cast tube to a double walled structure of the desired configuration (as plate, I-beam, rails, etc.) can be economically formed by most of the forming techniques and apparatus now known (as rolling mills, ironing dies, pressing, hammering, etc.) and such means are amenable to the partial or complete welding together of the intercontiguous surfaces of said structures during either, or both, the collapsing and sizing phases of structure formation with a modicum of equipment or power usage. Due to this, the means of product output is exceptionally versatile. Such collapse formation of tube to structural shapes would normally use only the final or sizing (lightest) mills and rolls and, since these are already available, the preferred method of the invention would be to cut-off discrete lengths of continuously cast tube or utilize discrete tube lengths produced by the teachings of U.S. Patent 1,864,270 (Eurich et al.) for processing through the already available light rolling mills. Eventually, (considerable advantage would be realized by the continuity of a continuous tube casting apparatus operating in conjunction with a tube collapse forming mill since this would permit the residual heat of the casting to be utilized for the hot forming operation and, also, would obviate a good deal of handling and transport. The use of combined continuous tube casting and immediate collapse of the cast tube (while still hot from the casting operation) permits a further innovation since tube collapsing and welding seals one end of the cast tube. The input end is either sealed by virtue of the type of tube casting process or can be sealed by various means. The sealing of both ends of the tube as it is being continuously cast permits the pressurization or depressurization of the tube interior during casting. Under specific conditions and types of operation, a marked advantage can accrue by use of such pressurizations or depressurization as shall be detailed in the instructions of this invention. It should be realized that conventional centrifugal casting of tube of the larger diameters (in the disclosed invention a tube four feet in diameter would be collapsed to a plate of about six feet in width, $\pi D/2$) have wall thicknesses of two to four inches or more. For the purposes of producing plate by this invention, a relatively thin-walled tube (about ¼ to 1 inch wall thickness) would be used although this would depend on the final product.

A further advantage also accrues from the continuity of continuous tube casting and collapse forming to longitudinal structure as evidence by the following excerpt: "Metallurgically, there are definite advantages in hot rolling aluminum directly after casting. Any internal voids and discontinuities are removed in the rolling process before hydrogen has an opportunity to diffuse and separate at these sites. Less trouble is also reported with blistering and slivering on finished sheet fabricated from ingot rolled immediately after casting." The foregoing quote is equally applicable to all other cast metals (as steel, nodular iron, nickel, copper, magnezium, zinc, etc.) which can be advantageously processed to structural items by the teachings of this invention's disclosure.

DESCRIPTION OF INVENTION

Accordingly, it is a primary object of this invention to completely reverse the long accepted method of manufacture utilized in the metals industry wherein slabs (as a basic starting item) are rolled to plate and the plate is then converted to tube or pipe by hoop-rolling and seam-welding or other methods. The object of the present process is to utilize cast tube (having a relatively thin or moderate wall thickness) as the basic starting item for the fabrication of longitudinal structural items by inwardly collapsing said cast tube walls into a double walled item of structure and the desired cross-sectional configuration and to then subject the collapsed configuration to a sizing operation to produce the final desired commercial product. It is also the intent to collapse form and roll (or otherwise) size the tube to longitudinal structure in one pass. Said collapse deformation to be done at the conventional hot forming temperatures for the metal being processed and with sufficient deforming forces to not only collapse and/or size the part but, also, to cause joining together of the inner contiguous surfaces by a partial weld or a complete weld as desired in the final structure.

It is a further object to utilize cast tube (whether in discrete lengths as a result of non-continuous tube casting or cut-off lengths from a continuously cast tube) in order to transfer to the final product the metallurgical integrity of such a tubular casting.

A still further object is to utilize centrifugally cast tube (whether in discrete lengths from batch-type centrifugal casting or cut-off lengths from a continuously centrifugally cast tube) in order to transfer to the final product the metallurgical integrity thereof and, also, the freedom of the surface metal from defects created by non-metallic inclusions.

A further object is to provide an improved method and apparatus for continuously forming a selected structural shape in successive stages including a first stage in which tubing is formed in a heated and softened condition (e.g. by centrifugal casting) and an immediately following second stage in which the tubing, while still in the heated, softened condition, is deformed into the selected structural shape (e.g. I-beam, channel, plate, sheet, etc.) by a deforming operation such as hot-rolling or equivalent deforming process which is facilitated by the heated condition of the metal.

In a preferred embodiment, the invention utilizes a horizontal apparatus which includes a substantially cylindrical mold rotatable about its longitudinal axis. Molten matter such as metal which is introduced into the rotating mold through an input end thereof is subjected to centrifugal forces thereby forming a layer, lining the cylindrical interior surfaces of said mold. The exterior of the mold is continuously cooled so that the layer of metal lining its interior surface solidifies to form a pipe or tubing. As molten metal is continuously introduced, the solidified tubing is drawn towards an output end of the mold where a pull-out assembly is positioned to continuously pull the cast tube out of the mold. The mold is designed to minimize frictional forces between the cast tubing and the mold thereby greatly reducing the power required to continuously extract the tubing from the mold.

The invention also provides for welding at least portions of the collapsed wall sections together to reinforce the selected structural section, and by performing this subsequent step with sufficient rapidity and with sufficient minimizing of the loss of heat, it is possible to effect the welding simply by rolling pressure without reheating, although the invention also contemplates the use of conventional welding techniques in the welding step.

In another embodiment of the invention, the apparatus further includes a draw (ironing) die and/or rolling assembly into which is fed tubing cast by the apparatus previously referenced. The die and/or rolling assembly includes draw dies and/or rollers which deform the tubing of substantially cylindrical cross-section into any one of selected structural shapes used for construction purposes. Since the structural shapes are formed by collapsing the tubing wall, the die assembly requires less power than comparable prior art arrangements which form structural shapes by deforming solid billets. In addition, since any impurities in the tubing cast by the centrifugal method hereinbefore described are embedded near the interior surface thereof when the tubing is collapsed, any impurities are at the interior surface of the new structural shape, and therefore less harmful to the structural characteristics of the finished shaped metal.

Other advantages gained from the continuous casting of matter in the form of a relatively thin walled tubing instead of the conventional billet-include high heat abstraction from the matter cast and greater shrinkage of the matter cast across the mold of a large diameter which contributes to easier extraction of the pipe from the mold. Also the tubing wall is easily deformable by draw-dies and/or rolls into various structural shapes with lighter equipment and less power than required by prior art systems. In addition, in the centrifugal casting techniques, the solidifying matter in the hot plastic range is stretched by the centrifugal forces and thus maintain a longer period of cooling contact with the mold wall than in conventional non-rotating solid wall molds.

In another embodiment of the invention, tubing is drawn (e.g. upwardly) from a pool of molten material in a fixed crucible or equivalent container, and is then processed into the selected shape by a subsequent stage of collapsing, rolling, welding, etc., as outlined above.

The collapsing of a tube especially where the initial cross-section is cylindrical or approximately cylindrical (e.g. of regular polyhedral form with a substantial number of sides such as six or more) tends to develop a problem of edge-splitting of folds between adjoining areas of the tubing wall that are collapsed into full doubled contact. A collateral object of the invention is to provide an improved method of avoiding such edge-splitting. This is accomplished by peening the developing fold to refine the grain therein, and to introduce corrective surface compressive stresses.

In the continuous process of centrifugally casting tubing and then collapsing the tubing by longitudinal deforming of the tubing as it emerges from the centrifugal mold, as contemplated by the invention the shut-down and restarting of the centrifugal casting and rolling operations poses a serious problem, in that the length of tubing extending between the casting mold and the deforming means, left in a cold, hardened condition in the shutdown, would present a much higher load resistance to being collapsed by the deforming means, than the heated, softened tubing delivered from the casting mold during the normal continuous operation of the apparatus. As a further collateral object, the invention aims to solve this problem by including a procedure for thinning down the wall of the tubing at the end of a run, so as to provide a length of tubing remaining as a starting blank, with a thinner wall which can be deformed without overloading the deforming means during subsequent startup, even though in a cold, hardened condition resulting from the shut-down.

The invention has as a still further object to provide an improved continuous centrifugal tube-casting and subsequent longitudinal deforming process for converting tubing into plate material, which, on rolling to sheet, will exhibit a superior surface finish.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a perspective envelope view of one form of apparatus that can be utilized to practice the invention;

FIG. 1A is a side elevational view, partially broken away, of another form of the apparatus, for continuous processing;

FIG. 2 is an axial sectional view representative of a solid wall centrifugal mold which might be utilized to produce cast tube for the purposes of this invention.

FIG. 5 is a cross-sectional view of a rotatable rolling mill (such as that shown in FIG. 1A) which can be utilized for longitudinal rolling deformation of tubing emerging from a centrifugal mold, in a continuous operation in which the rolling mill rotates in unison with the mold about the longitudinal axis of the emerging tubing;

FIG. 6A is a cross-sectional view illustrating the deformation of a cylindrical tube into a flat plate;

FIG. 6B is a longitudinal sectional view of portions of the same, taken transversely of the axes of the deforming rolls; and showing another modification of deforming means;

FIG. 6C is a plan view of the same, with the tube shown partially in axial section;

FIG. 6D is a perspective view of the same;

Figure 8:
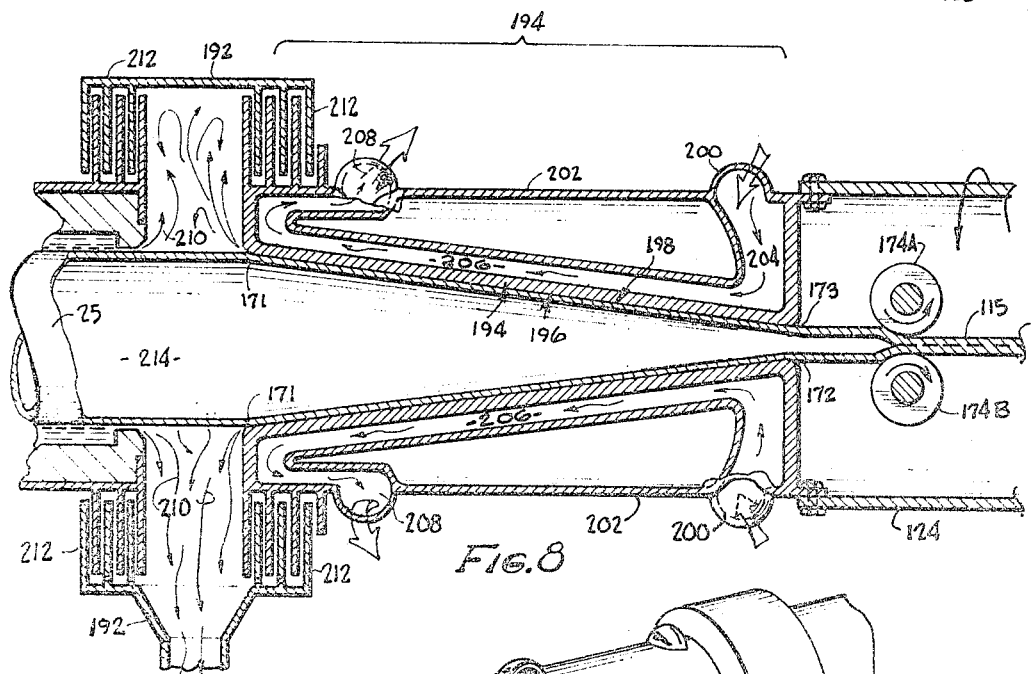
Figure 8A:
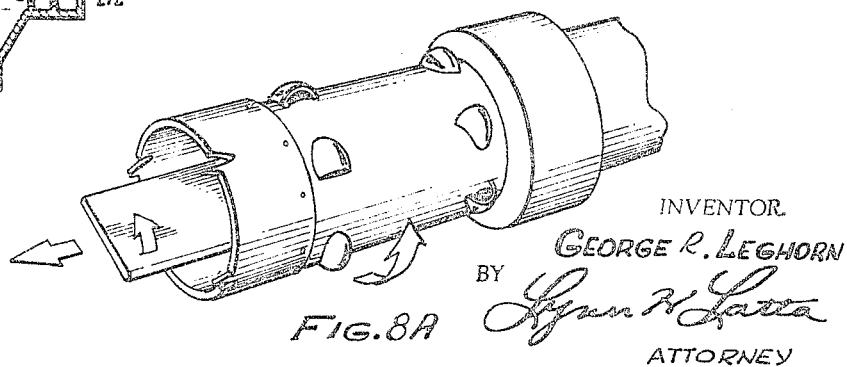

FIGS. 7A, 7B 7C, and 7D are views illustrating the gradual deformation of tubing into an I-beam section;

FIG. 8 is a side sectional view of a draw (ironing) die;

FIG. 8A is a perspective view of the same;

FIG. 9 is a fragmentary side sectional view of a mold with a seal to control the atmospheric conditions within the mold;

FIGS. 10A and 10B are fragmentary sectional views of a modified form of the rotary rolling mill of FIG. 5, having means for releasing the drive to the pull-through rolls during shut-down procedure;

FIG. 11 is a fragmentary side and sectional view of the rotary casting mold, illustrating the thinning down of the wall of the tubing being cast, in order to provide a thinner-walled starting blank to facilitate startup procedure.

FIG. 12 is a sectional view schematically illustrating an alternative method of casting the tubing in the first stage of my process;

FIG. 13 is a cross-sectional view schematically illustrating the mechanical treatment of the folded margins of a collapsed tube to inhibit edge-splitting.

The process—in general

Referring now to the drawings in detail, and in particular to FIGS. 1 and 1A, I have shown therein, by way of example, two forms of apparatus by which the invention may be practiced, each embodying, in general, a centrifugal mold unit A, in which tubing 25 (e.g. metallic) is cast as a first stage of my process; a cooling unit C in which the tubing 25 is solidified to a self-sustaining condition as it is discharged from the mold A; and a deforming mill E (in FIG. 1) in which the tubing 25, while in a heated, highly malleable condition, is deformed to a selected structural section which, in FIG. 1, is shown for the purpose of illustration as being a channel, and in FIG. 1A is shown as being a plate. In FIG. 1, the method further utilizes a cut-off unit F for severing the tubing into lengths as it emerges from the cooling unit C; and the length of tubing, after cut-off, is moved over to the mill E and subjected to the deforming stage, preferably without any intervening delay such as would cause the tubing to cool to a hardness such as would undesirably increase the load on the rolling mill or would require reheating, although the invention contemplates the use of a reheating step in some applications. In FIG. 1A, the tubing is continuously processed through the casting mold A and the deforming mill E1 without severance, and the mill E1 is mounted for bodily rotation in unison with the casing mold A and cooling unit C, about the longitudinal axis of rotation of the mold, the tubing 25 also rotating as it leaves the mold and passes through the mill E1.

The first processing stage of forming a tube may utilize various alternative methods of tube-casting including, among others, the drawing upwardly from a molten pool through a circular mold capping the pool, as hereinafter disclosed more in detail, or the preferred method of centrifugal casting. Also, the mold A may be embodied in various alternative forms, as noted under "Tube Availability."

First Stage—tube molding

Reference is now made to FIG. 2 which is a cross-sectional view of a rotatable continuous tube casting apparatus wherein the mold wall is composed of a dense impervious graphite or other slippery (self-lubricating) refractory material such as boron nitride.

It is the intent of FIGURE 2 merely to depict a type of tube casting apparatus illustrative of the prior art amenable for production of cast tube and previously mentioned under "Tube Availability." FIGURE 2 depicts such a tube casting apparatus in its simplest conventional form and is not to be regarded as limiting of the tube casting means.

The apparatus of FIGURE 2 can produce a cast tube by continuously pouring molten metal (as aluminum) into the starting end 10 of the rotating mold 11 via the pouring spout 12. The molten metal 13 forms a molten tubular liner 14 within the tubular graphite lining 15 of the apparatus due to the centrifugal forces. The solidified tube 25 is extracted from the rotating mold by any conventional means such as that shown in Patent 22,708 issued to Maxim in Great Britain. In practically all such devices, the refractory lining 15 is contained in and supported by a metal (as steel) shell 16, the exterior surface 17 of which is cooled by water sprays 18 from a multiplicity of nozzle 19.

From the foregoing description, it should thus be appreciated that the thickness of the solidified tube 25 is a function of the rate at which molten metal is introduced into the mold as well as the rate at which the solidified tube is extracted therefrom. It should further be appreciated that in the tube solidified or cast by the centrifugal method of the invention any non-metallic impurities or inclusions will be drawn toward the inner surface 23A of tube 25, thereby improving the structural characteristics of the tube and objects made by collapse forming of the tube. Furthermore, since the tube is continuously extracted from the mold, the casting process enables the casting of a tube of any desired length irrespective of the dimensions of the mold.

Final stage—deforming to structural section

Figures 3A, 3C:
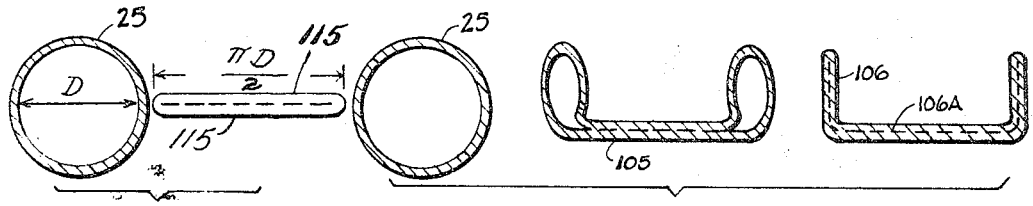
FIGS. 3A, 3B and 3C are cross-sectional views illustrating sequences of deformation of tubing into various structural shapes.
Figure 3B:
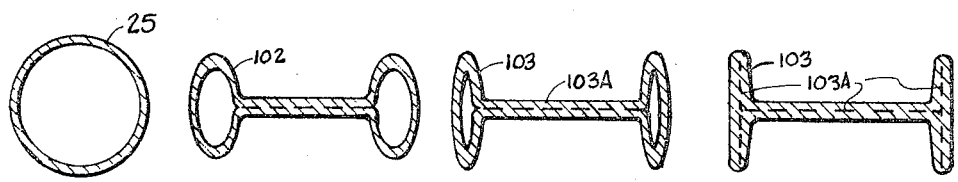

Taking up now the final stage of my process, reference is made to FIGS. 3A through 3C. In each of the figures, a circular cross-section of a tube 25 is diagrammed on the left while on the right of each figure is diagrammed a cross-section of a desired structural shape which may be formed by collapsing the thin wall of the tube 25. For example 40 in FIG. 5A a plate with a cross-section 115 which has a width equal to $\pi D/2$ may be produced by passing the tube 25 through a die and/or rolling assembly with two pairs of oppositely positioned rollers which deform the circular shape into a plate. Similarly, in FIG. 3B the tube 25 may be passed to series of die and/or rolling assemblies which may first convert the pipe into a beam having a dogbone-like cross-section 102 and thereafter further deforming the beam to have an I-shaped cross-section 103 with portions of the inner surface of the tube 25 being roll welded as indicated by dashed line 103A.

It should be appreciated that since the I-beam is formed from a circular tube by collapsing the tube's relatively thin wall, the inner surface of the tube is squeezed towards the interior portion of the desired beam. Therefore, if the tube is produced by the centrifugal method whereby any impurities are attracted towards the inner surface, when such a tube is deformed, any impurities will not be near the exterior surfaces of the beam thereby resulting in a structurally superior beam since the critical areas of any structural member are almost invariably the exterior surfaces.

In FIG. 3C, there is shown another example of a sequence of cross-section deformation from a circular cross-section of tube 25 to a crescent-like cross-section 105 and therefrom to a U-shaped channel 106 with a roll welded interior surface 106A. It is appreciated that various metal deforming or rolling techniques may be employed in practicing the teachings of the present invention of collapsing the relatively thin circular wall of a tube preferably cast by the centrifugal method (but not limited to centrifugally cast tube) into desired shapes. One of the major advantages of collapsing a thin walled tube is the reduced power necessary for metal deformation, since the thickness of the metal which is reshaped is small, and the metal is squeezed inwardly. Such a technique greatly simplifies the metal rolling problems known in the present state of the art where the accepted technique is to convert solid billets into metal structural shapes directly. The greatly reduced power necessary for the deformation of a tube into structural shapes affords the added advantage of requiring much smaller mills to accomplish this end and thus permits a greatly reduced capital investment.

It can be appreciated that bonding (as by hot-roll welding) of the interior surfaces of a tube, collapse-deformed into structural shapes as illustrated in FIGS. 3A, 3B and 3C, is not always necessary. Such a structural shape can, in many instances, fulfill its design without such bonding. Also, various degrees of effectiveness in bonding can be used and still maintain an adequate structural integrity in the member so fabricated. For example, the web or flange sections can merely be spot welded at intervals along its longitudinal axis in either the web section or in the web and flange sections. Also, the interior surfaces are amenable to other joining processes such as brazing. All of the continuous tube-casting processes herein disclosed permit the addition of a lower melting constituent (as copper powder or granules for steel tubes) onto the solid or semisolid interior surfaces of the tube where it exits from the casting mold. This lower melting constituent permits the interior surfaces to be braze-bonded during the collapse-deformation process. Such means, other than roll welding, permits the use of even lighter mills and less power than required by roll weld bonding of the interior surfaces.

Rolling mill deformation

Figure 4A:
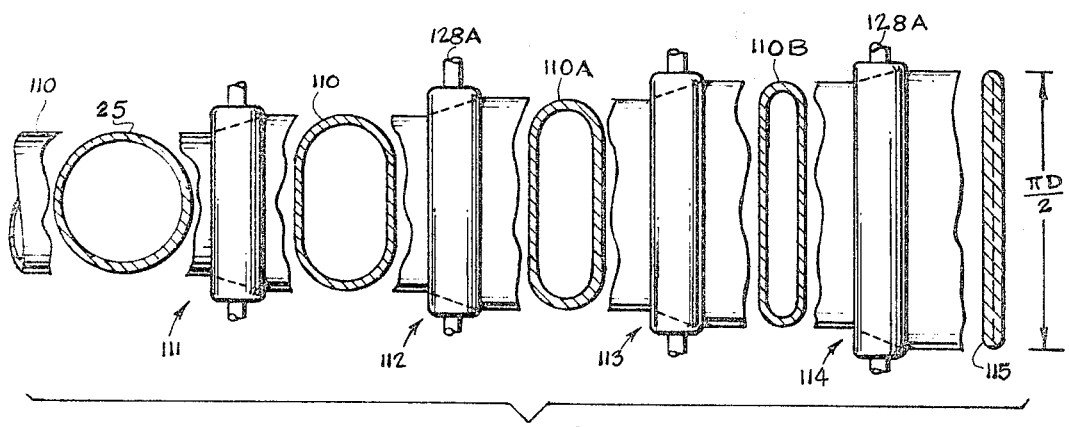
FIGS. 4A and 4B are top and side views respectively, of a rolling apparatus for deforming tubing into a plate.
Figure 4B:
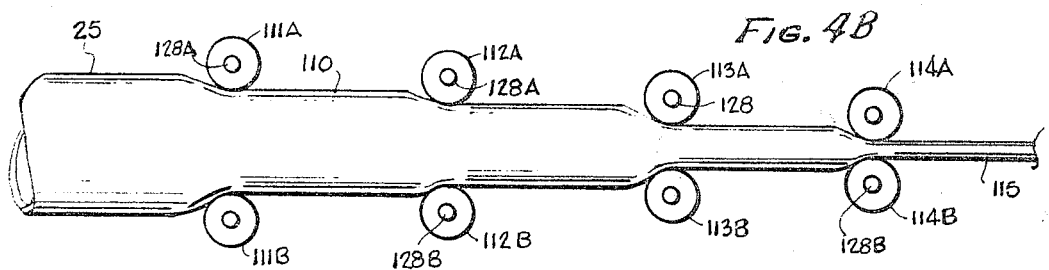
Figures 7A, 7B:
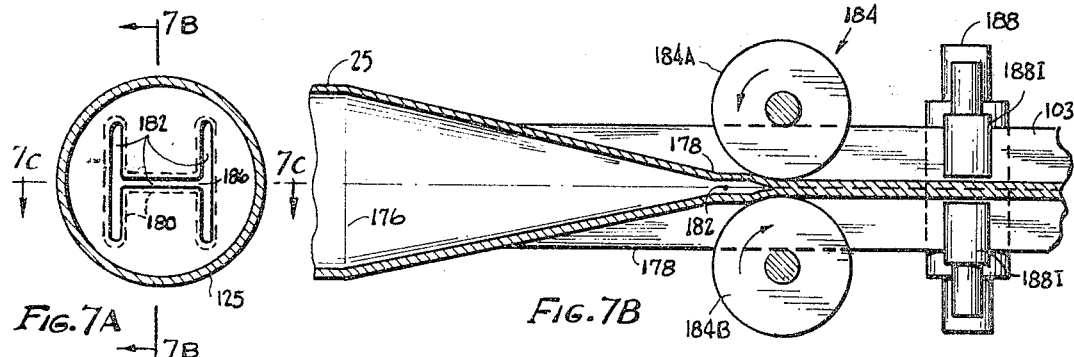
Figures 7C, 7D:
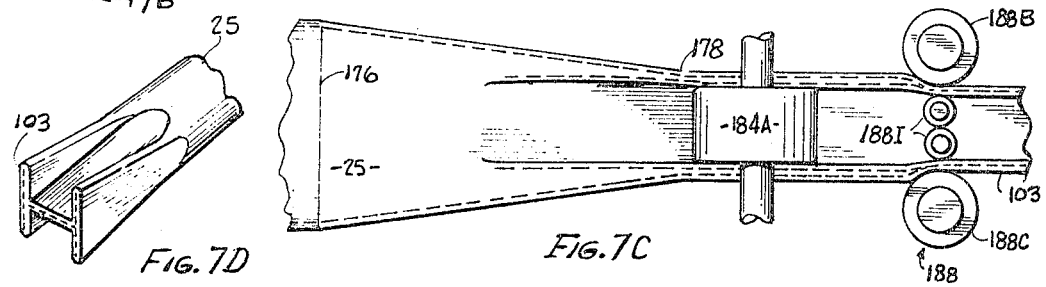

FIGS. 4A and 4B disclose how the deforming of the tube can be performed in a sequential rolling assembly including a plurality of rolling stages (e.g. the mill E1 of FIG. 1A) for forming a metal plate from a circular tube. As seen from the figures, a tube 25 after passing through the first rolling stage 111 comprising rolls 111A and 111B is deformed into an oval shaped tube 110. The latter is then passed through successive rolling stages 112 through 114 comprising rolls 112A, 112B, 113A, 113B, 114A, 114B respectively. These rolls deform tube 25 into tubes 110A, 110B, of successively flatter ovals, with the output of the last stage being a plate 115. The thickness of plate 115 is slightly less than twice the thickness of the wall of tube 25 while the width of the plate is equal to about half the circumference of tube 25. The last rolling stage 114 deforms the plate sufficiently to produce welding of the interior faces of the flattened tube.

The point should further be emphasized that if tube 25 is produced by centrifugal casting any impurities will be embedded within plate 115 and removed from its exterior surface, thereby producing a superior plate. The plate 115 may then be supplied to any appropriate edge trimming equipment or additional rolling machinery to reduce its dimensions to the desired values.

The particular die and/or rolling assembly used together with any of the embodiments of the tube-casting apparatus herebefore described would depend on the particular desired structural shape as well as on whether the deformation of the tube is done prior or after cutting the tube to its desired length by cutting means F (FIG. 1).

If it is desired to produce the various structural shapes prior to cutting the tube, it should be appreciated that since the tube is formed in accordance with the teachings of the present invention by the centrifugal method, the tube extracted out of the mold, such as mold 51, rotates about its longitudinal axis. Thus any die and/or rolling assembly which is to deform such a tube has to rotate in synchronism therewith.

FIG. 5 discloses a cross-sectional view of one example of a rotating rolling mill (e.g. the mill E1 of FIG. 1A). The mill E1, as shown, includes one or more stationary ring gears 121 with internal teeth 121A. Within gears 121 a rotatable cylinder 124 is supported on rollers 125 which are coupled by drive shafts 126 to the driving means of the mold apparatus so that they rotate synchronously. Cylinder 124 supports a series of rolling stages, comprising the rolls 111A, 111B–114A, 114B having shafts 128A and 128B respectively appropriately supported within the cylinder. The cylinder 124 also supports gears 131 and 132, which are meshed with the teeth 121A of gear 121. When cylinder 124 is rotated in a direction as indicated by arrow 145, gears 131 and 132 rotate in an opposite direction as indicated by arrows 146 and 147 respectively.

Gear 131 is coupled to shaft 128A by means of a gear train assembly only one unit of which is shown in FIG. 5. Spur gear 131 drives spur gear 151. Spur gear 151 and worm gear 152 are both axially supported on and integral with a shaft 161. Worm gear 152 drives the roll 112A by means of a mating gear 153 which is coupled to roll 112A by the integral shaft 128A. In like manner, gear 132 is coupled to shaft 128B. The resultant of this gear train translation of the rotary motion of the cylinder frame 124 is that rolls 112A etc. and 112B etc. rotate in opposite directions and at a reduced (geared down) speed, the directions being indicated by arrows 157 and 158. The action of the pairs of rolls tends to pull the tube supplied thereto, to collapse the tube walls therebetween and to deform its circular cross-section into the oval cross-section designated in FIG. 5 by numeral 110, with successive flattening action as in FIGS. 4A and 4B. Shafts 128A and 128B may be coupled by means of sprocket and chain drive assemblies 163 and 164 respectively (see also FIG. 1A) to succeeding rolling stages such as stages 111 through 114 of FIGS. 4A and 4B.

It should be appreciated that different arrangements may be used to power succeeding rolling stages. For example the gear train of the roll assembly may be incorporated for each of the stages 112, 113 and 114 by extending shafts 161 and 162 axially down the rotating frame 124 to each of the succeeding stages as a means of power transmission.

One of the advantages of the rotating, in-line, sequential rolling mill 120 of FIG. 5 is that it is a substantial sealed system. The exit port for the structural member being formed can be of the same shape as the member and oversize by an amount that leaves very little gap between the exiting member and the end closure. The only other openings are the very limited slots in frame 124 through which the spur gears 131 and 132 portrude through the cylindrical frame 124 to mate with ring gear teeth 121A. Due to this essentially closed system, a protective atmosphere can be maintained within the cylindrical frame 124 that will protect the external surfaces of the hot formed structure from oxidation by the atmosphere.

The rotatable rolling mill 120 herebefore described is only necessary if the cast tubing is to be deformed prior to being cut to the desired length. However if the tube prior to being deformed is cut to any desired length by any conventional tube cutting means 35 (FIG. 1) the die assembly need not be rotated since the tube to be deformed is not rotating. Therefore a stationary rolling assembly frame (FIG. 1) may be used to support one or more rolling stages to collapse a non-rotating circular tube into the desired structural shape.

Instead of rolling, the deforming stage may utilize press-forming, in which a selected length of tubing, after being delivered from the mold, is deformed between press dies of the same length. For example, the tube can first be engaged between a pair of opposed parallel die bars at diametrically opposite sides thereof, and thereby collapsed to the dog-bone cross-section 102 of FIG. 3B, and the bulging lateral portions of this cross-section can then be pressed inwardly between flat parallel die bars against the sides of the first set of die bars, so as to collapse the bulging lateral portions into the flat folded lateral flanges of the final section seen in FIG. 3B, in a manner analagous to the flattening of the side flanges of an I-beam as hereinafter described in connection with FIG. 7B.

*Ironing type deforming*

FIGS. 6A, 6B, 6C and 6D disclose tube-deforming assembly in which a draw (ironing) die 175 (shown fragmentarily—see FIG. 8 for details) draws down a centrifugally cast tube 25 as it exits from a continuous casting machine such as that shown in FIG. 2. The draw die draws the circular tube section, beginning at point 171, into a flattened circle at 172 having an inner open space 173. The flattened section 172 then passes through roll assembly 174 which is composed of two driven opposing rolls. These rolls are driven by a mechanism such as the gear train shown in FIG. 5, and operate to pull the circular tube through the draw die 175 and to form it into the structural shape 172. It has the further purpose of roll-welding the flattened inner surfaces of structure 172 together to form a plate 115. The entire assembly, including the tube 25, draw die 175, rolls 174 and flat roll welded plate 115 are rotated at the same speed and by the same drive shaft as is the continuous casting mold which casts tube 25.

FIGS. 7A, 7B, 7C and 7D disclose a tube-deforming draw die roll-pull assembly similar to that of FIG. 6 but with the intent of forming an I-beam structural shape. In this instance, tube 25 is drawn into the circular entrance of a draw die (not shown) and exits at the oversized I-beam shaped exit of the draw die at 178. The exit cross-section of the draw deformed pipe at point 178 is shown as the hollow I-beam shape in FIG. 7A and is designated as 180. An important feature of the draw die is that an open space 182 is left at the interior of the I-beam shape at point 178 where the shape exits from the draw die. The draw die hollow I-beam shaped structure 180 is drawn through the draw die by the power driven roll assembly 184 which is composed of two (top and bottom) opposed rolls 184A and 184B which rotate in opposite directions in such a manner as to pull the tube through the draw die into the I-beam shape 180. The rolls 184 are so spaced that they roll-weld the interior web faces of the shape 180 to form a solid web. The I-beam shape 180 (with the web roll welded) then passes through a further rolling assembly 188 which is composed of two power driven rolls 188B and 188C which oppose each other and rotate in opposite directions in such a manner that they pull the I-beam shape from left to right as viewed in the drawing. In the U-grooves on the top and bottom of the I-beam shape are two sets of idler rolls 188I each set of which is back to back in intimate contact so that they back each other up and rigidize the idlers. One of these idler sets oprates in the top U-groove of the I-beam section and the other idler set operates in the bottom U-groove of the I-beam section. These idler sets form a back up which permits the power driven side rolls 188B and 188C to roll squeeze and weld the internal surface of the flanges of the I-beam together. In this manner, the structural shape exiting from the roll assembly 188 is a complete I-beam 103 of solid cross section having roll-welded interior surfaces. The roll assemblies 184 and 188 are driven by a gear train mechanism such as that shown in FIG. 5.

FIG. 8 discloses fragmentarily a continuous tube-casting (of the liquid wall type) and ironing die assembly which incorporates a sealed liquid lead catch ring and sump 192 (for containment of noxious lead vapors), a draw (ironing) die assembly 194 (for drawing the tube exiting from the centrifugal mold at the left) and a frame 124 of FIG. 5 with integral pull-out and seam-welding roll assembly 174 of FIG. 6B. At the leftward side of FIG. 8 is seen the outlet end of the centrifugal mold and, with the exception of the catch ring and sump 192 which is stationary, all of the parts rotate at the same rate of revolution as a result of a common drive (not shown). The draw die 194 is illustrative only and can be any type which deforms tubing into a semi-structural member such as plate, the hollow I-beam shown in FIG. 7, or other such item. For the sake of simplicity, the draw die 194 is that which converts tubing into a flattend circle 172 having an inner open space 173 which is subsequently roll-welded to form solid plate 115. The purpose of the open space 173 is to prevent any binding or jambing up of the draw die-deformed tube at the draw die exit orifice 172 in the event that the continuously cast tube might have a greater than normal wall thickness due to inadvertent pouring of too much molten metal into the centrifugal mold. Such variations in tube wall thickness merely vary the opening 173 while the thickness of the flattened circle remains constant.

The primary purpose of FIGS. 8 and 8A is to illustrate the draw die and the method of cooling same. The draw die inner surface is composed of a hard, wear-resistant and heat-resistant material such as a hot work die-steel (the working face 196 or the draw die may be nitrided or hard chrome-plated to increase its wear life) and is air-cooled on its opposite face 198 by means of forced air circulation which originates from a multiplicity of air scoops 200 which are equally spaced around the exit end periphery of the draw die frame 202. The rotary motion of the draw die assembly 194 causes the scoops 200 to force cool air down ducts 204 and along channels 206 and thus to a multiplicity of scoops 208 which are equally spaced around the entry end periphery of the draw die frame 202. These scoops 208 have their orifices opposite to that of scoops 200 so that the rotary motion of the draw die assembly 194 causes a suction effect and aids in venting the heated air from the channels 206 of the draw die assembly.

It can be easily visualized that the air scoop arrangement previously depicted can be utilized for cooling other areas of the rotating assemblies.

With reference to FIG. 5, the vertical frames 127A and 127B can be made continuous down the axis of the cylinder frame 124 so that they divide the cylinder frame 124 into three separate compartments which are effectively sealed one from the other. Frame walls 127A and 127B encompass area 130 which contains the pull-out and deforming rolls series. Area 130 can be maintained with a cool inert atmosphere (nitrogen gas as an example) which is continuously replaced by virtue of non-rotating supply and exit manifolds around and encompassing the entry and exit scoops. By this means, the inert atmosphere of chamber 130 can be conducted to a cooling apparatus and recirculated to chamber 130 as a means of abstracting waste heat from the structure being processed. In like manner, areas 129A and 129B can be continuously cooled by appropriate scoops which circulate cool air through these chambers 129A and 129B to prevent the gear train mechanism from overheating.

It can also be appreciated that the circumferentially arranged scoops 200 and 208 of the draw die assembly depicted in FIGS. 8 and 8A can be surrounded by stationary manifolds containing cooling water so that the scoops 200 force the water through the channels 206 and thus more effectively cool the draw die surfaces 196. Scoops 208 would act as suction vents to the water circulating system.

The same arrangement can be used to force cooling water through interior channels on the rolls 128A and 128B of FIG. 5, and the pull-out rolls of FIGS. 6, 7 and 8, by means of water seal couplings attached to the ends of hollow roll shafts. Such cooling of these rolls would greatly prolong their service life and effectiveness.

A number of advantages accrue from the use of the draw (ironing) die assembly as follows. The liquid lead 210 adhering to the external surface of the tube 25 (where a tube-casting process of the liquid-wall type is used) is substantially removed from the surface by pressure contact with the entrance orifice of the draw die at point 171 and is centrifuged into the stationary catch ring and sump 192 for reuse. The slight film of liquid lead remaining on the exterior surface of the tube acts as a lubricant between the tube and the draw die surface 196 thus permitting greater ease in collapse deformation of the tube to structural shapes. Also, the lead is maintained in a closed system by the catch ring seals 212 and is thus prevented from being hazardous to operating personnel. Also, the inside of the continuously cast tube can contain an inert atmosphere such as nitrogen gas or argon gas containing small quantities of a vaporized reducing metal such as potassium or sodium which prevents oxidation of the interior surface of the continuously cast tube thus greatly facilitating the roll welding of these internal surfaces one to the other by the rolling assembly 174.

FIG. 9 discloses how containment of the inert or reducing atmosphere within the tube cavity 214 is accomplished by end closure of the tube during roll welding by the rolling assembly 174. The tube cavity 214 is sealed at the pouring end of the rotating mold by means of the stationary end seal 216 the periphery of which is immersed into a centrifugal annular basin of a heavy, high-boiling point liquid 20 (such as molten tin, lead, cadmium, etc.). By this means, a partial vacuum (if desired) can be maintained in the tube cavity 214 with the advantage of permitting degassification of the liquid metal being continuously and centrifugally cast. Also, the partial vacuum inside the tube cavity 214 greatly aids in the collapse of the tube into structural shapes by either the roll forming system illustrated in FIGS. 6A, 6B and 7 or the draw die roll pull-out system illustrated in FIGS. 8, 9, and 10.

The protection of the internal surfaces of the continuously cast tube 25 can be accomplished without an end seal by the expedient of introducing small amounts of a powdered or granulated low melting glass, or salt having the following characteristics with respect to the metal being continuously cast into tube: (1) has a considerably lower melting point than the freezing temperature of the metal being cast; (2) has a higher boiling point than the pouring temperature of the metal being cast; (3) has a lasser density than the metal being cast; (4) is substantially immiscible with an non-reactive to the metal being cast. A great many glass compositions meet these requirements. Barius and calcium chlorides are examples of salts which meet the requirements with respect to continuously cast steel tube.

Also, a powdered or granulated brazing material (as copper for steel) can be co-added with the salt or glass where a braze bond instead of a roll weld bond is desired on the internal surfaces of such tube 25 to be used for collapse deformation to structural items. The addition of a low melting protective fluid onto the internal surface of such continuously cast tube is the preferred method where discrete lengths of tube are cut off of the continuously cast tube, as it exits from the casting mold, and are then collapsed formed into structural items by non-rotating means such as a sequential rolling mill or a draw die and roll-pull-out assembly. In such a non-rotating process, the internal protective fluid (as molten salt) remains as a thin film on the tube section internal surface for a length of time sufficient to permit roll welding or brazing of the internal surfaces one to the other. The excess fluid is roll squeezed out of the trailing orifice of the tube, just as toothpaste is squeezed out of a toothphaste tube, and can be collected in appropriate catch basins for reuse.

*Starting and stopping the continuous tube-casting process*

In the foregoing description (in conjunction with FIG. 5), it has been assumed that the rolling assembly for deforming the tube into selected structural shapes is integrally coupled to the rotating mold so that the rolling stages are powered so long as the mold continues to rotate. Under some circumstances, it may be desirable to stop the rolling stages without stopping the mold from rotating. As is appreciated by those familiar with the art of intercoupling and decoupling rotatable assemblies, this may be accomplished by selectively coupling the ring gear 121 (FIG. 5) to the supporting frame on which it is mounted. When the two are integrally coupled such as by appropriate brakes, power is transmitted to the rolls 112A and 112B as herebefore described. However, when the brakes are released and gear 121 is free to rotate with respect to the supporting frame, power delivered by shafts 126 will cause the continued rotation of the frame 124 and the enclosed deforming mill. At the same time, the resistance to deformation of the tube 110 will stop the rolls 112A and 112B since they are no longer power driven by the gear trains interconnected to ring gear 121. Gear 121, being released by the brakes, is free to rotate about the longitudinal axis of the deforming mill at the same rotational speed and in the same direction as the mill frame 124 and are locked together by the gear teeth 121A of ring gear 121 and the gear teeth of gears 131 and 132.

The methods of starting and stopping the processes herein described will be treated separately in two categories. Category A will encompass those machines wherein the tubing is cut off into discrete lengths as it exits from the centrifugal mold for separate processing into structural lengths on separate non-rotating mills (e.g. FIG. 1). Category B will encompass those machines wherein the rotating mold is in-line and integrated with a rotating mill (e.g. FIG. 1A) so that the manufactured object which exits from the mill is a complete structural shape or a structural shape preform. As a matter of descriptive convenience, the stopping operation will be delineated first and the starting operation will then be described.

CATEGORY A

Centrifugal continuous casting machines having a solid inner mold such as that shown in FIG. 2 are shut down merely by cutting off the supply of molten metal being cast, and swivelling the pull-out rollers to adjust the pitch and angle (ref: British Patent No. 22,708) to zero to stop the withdrawal of the tube. The tube left in the bore of the machine is allowed to completely solidify to a rigid cylinder while the mold is still spinning. The spinner motor is then shut down and the mold allowed to come to a stop. The tube section in the mold bore is allowed to remain in the bore as a starter blank for the start-up operation.

On starting up, the power is turned on and the mold with its contained starter blank is brought to centrifugal rotating speed. Molten metal to be cast into tube is then poured at a predetermined and measured rate into the entrance end of the mold where it welds to the solid starter blank. The starter tube is pulled out of the exit end of the mold at a predetermined rate by swivelling the ring of extraction rollers as noted in British Patent No. 22,708 to the desired feed pitch angle. In the case where the machine is shut down for repairs (as for replacement of mold wall lining), the frozen tube which has been allowed to solidify completely in the mold is pulled out of the exit orifice and used as a starter blank on start-up after repairs have been completed.

The start and stop procedure for normal operation (no repairs required) will be detailed first for the liquid centrifugal mold machine as exemplified by British Patent No. 22,708. With the liquid mold machine, it is both convenient and a matter of greater economy to keep the mold centrifuging for prolonged periods of time when not in actual use for producing tube.

In stopping the tube production, the pull-out swivel rollers are swivelled until their feed pitch is zero. The tube rotation continues but no pull-out force is exerted. Pouring of molten tube metal into the liquid mold entrance end is discontinued and the tube is allowed to solidify over its entire length in the still centrifuging mold. The tube may be pulled out a few feet when solidification is nearly completed so as to create a thinner tube section at the entry end of the mold (this may be done also with the solid mold types). The completely frozen tube is left in the rotating mold as a starter blank for the next start-up.

In restarting tube production, the solidified tube within the rotating liquid mold acts as a starter blank. Molten tube metal is poured at a predetermined rate into the entrance end of the mold, the pull-out rollers are swivelled through the predetermined pull-out angle to restart tube pull-out.

Where complete shut-down for repairs to the machine is required, the pouring of molten tube metal is discontinued, the pull-out rollers are swivelled to zero angle to stop pull-out and the tube is allowed to solidify in the liquid mold bore for subsequent use as a starter blank. After complete solidification, this starter blank is pulled out of the bore, by swivelling the pull-out rolls to the usual pull-out angle, and stored for subsequent use in startup operation. The rotating mold is gradually braked to a stop so that the liquid mold material can be drained out of the mold cavity into a catch basin and thence to a heated storage tank.

In starting up after repairs, the starter blank is inserted axially into the mold cavity by way of the exit end and is centered therein by means of a rotatable bearing and holding fixture inserted into the interior of the tube from the starter end and in alignment with the axis of the mold. The pull-out rollers are set at zero pitch angle to prevent pull-out and the mold machine is started rotating to attain centrifuging speed. The liquid mold material in the storage tank is then pumped into the liquid mold cavity until the desired liquid mold level is achieved. The rotable bearing and holding fixture attached to the tube interior at the entrance is now removed and molten tube metal is poured in. The pull-out rolls are then swivelled to the predetermined pitch for pull-out of the tube. The foregoing liquid-wall centrifugal casting machine with attendant swivel pull-out rolls is disclosed in the above-mentioned British Patent No. 22,708, issued to Hiram and Hudson Maxim. It is well illustrative of a workable liquid-wall mold centrifugal tube casting process, when used in conjunction with the materials now available.

CATEGORY B

Starting and stopping of the solid and/or liquid wall mold machines is essentially the same as for category A with the following important exception. When output stoppage of structural shapes is required, the amount of molten tube metal being introduced into the entrance end of the centrifugal mold is severely curtailed but not stopped. The actual flow of molten metal is cut down to that amount which will produce a lightweight tube having a wall sufficiently thin so that it can be draw-die and/or roll deformed (by the mechanism shown in FIGS. 4, 5, 6, 7, 8 and 10A–B, or other conventional means) when at room temperature by the lightweight pull-out and forming rolls of the overall mill assembly (e.g. E1 of FIG. 1A). This restricted pouring of molten tube metal is continued until the lightweight structure so cast is actually exiting from the exit orifice of the rotating forming assembly. At this time the brake shoe 250 of FIG. 10 is disengaged from the brake drum flange 254 so that the tube is no longer pulled axially from the centrifuging mold but continues to rotate. Rotation is continued until the tube section in the centrifugal mold solidifies in its entirety. The lightweight tube section and structural shape is allowed to cool to room temperature and remains in the machine as a startup blank. The machines can then be stopped as in category A although it is preferable to leave the entire assembly of the liquid mold types rotating (with pull-out rolls inactive) until a resumption of structural shape output is required.

In starting up the machines, the cold thin-walled tube and deformed tube structure acts as a starter blank which can be readily deformed at room temperature and pulled through the rotating system by the power driven rolls of the draw die or rolling system. In startup, molten tube metal is poured into the entrance of the mold cavity at the decreased rate that produces the same tube wall thickness as the thin-walled starter blank that was left in the rotating machine. At the same time, the ring gear 121A (FIG. 10) is braked to a stop (by engagement of the brake shoes 250 to the brake drum flange 254, FIG. 10) to start the pullout rolls of the mill assembly going. Once the thin-walled structural product exiting from the mill attains normal production temperature, the rate of pour of molten tube metal is increased to normal requirements. Startup is then completed.

In the case of complete shutdown for repairs, it is necessary that the rotating mill section (draw die and/or rolling assembly E1, FIG. 1A) be pulled away from the mold section C. This can be accomplished (after cooldown of the starter blank to room temperature and stopping the rotary motion of the overall machine) by uncoupling the mill assembly E1 from the mold assembly C and moving the mill assembly E1 (with its encompassed starter blank) away from the mold assembly in a straight line so that the starter blank is pulled axially out of the mold assembly. The cylindrical section of the starter blank extends from the entrance orifice of the mill assembly E1 and is appropriately supported to prevent distortion.

FIG. 1A discloses a convenient and practical means of divorcing the mold assembly and mill assembly wherein the mill assembly is mounted on a movable, in-line, flat bed such as a modified railway flat car. Appropriate disengageable couplings for the power drive shaft completes the picture. In startup, the mill assembly (with its encompassed starter blank) is moved back into conjunction with the mold assembly. The cylindrical tube section then extends into the mold section orifice. All other procedures are as previously described.

FIG. 1A illustrates how the separation of the deforming apparatus and starting blank from the mold can be accomplished. Merely by way of example, the mill E1 is shown as being mounted on a portable support 133, e.g. a railway flatcar which can be mounted on rails 133A for travel in a path aligned with the mold axis. This arrangement makes it possible to withdraw the mill E1 axially away from the mold A, the starting blank being withdrawn along with the mill and supported thereby in a position projecting from the inlet end of the mill, aligned with the mold axis so that it can later be reinserted simply by wheeling the truck 133 back toward the mold.

FIG. 1A also illustrates how the finished structural section can be cut off into selected lengths by a cut-off unit F1 which, as shown, can be a shear, mounted in the mill housing E1 and turning therewith so as to maintain a fixed relation to the plane of the finished structural member (e.g. plate) emerging from the mill rolls.

It will be noted that on the initial startup of a new machine, an appropriate starter blank must be prefabricated. After this, the stopping procedure creates the starter blank for the next startup.

FIG. 11 discloses at 25S a portion of the thinned wall starting blank formed as an integral extension of a preceding portion of tubing 25. The starting blank is extended to such length as may be required in order to separate the tubing and the deforming apparatus from the mold, to effect such servicing or repair on the mold as may be required, to subsequently reassemble the deforming apparatus to the mold outlet and to simultaneously reinsert the starting blank into the mold and start the operation of the mold and the pouring into the mold inlet of melted casting material which unites with the end of the starting blank to form a new section of tubing which is then drawn out of the mold by traction applied through the starting blank, and to run the thin-walled starting blank through the deforming apparatus (e.g. the rolling mill E1 of FIG. 1A) without the necessity of reheating the relatively thin wall of the starting blank so that it can be handled by the mill E1 without overloading. The new relatively thick-walled section of tubing, drawn by the starting blank, will, of course, be in a heated, softened condition so that the deforming thereof in the mill presents no problem.

Reference is now made to FIGS. 10A and 10B which are partial end and side views respectively of another arrangement of the support base (frame) 121, the internal ring gear 121A, the spur gear 131 or 132 mating to the internal ring gear 121A, and the rotatable cylinder frame 124 as depicted in FIG. 5.

As a convenience in startup and stopping the continuous and integral deformation of tube as it exits from the centrifugal tube casing mold, it is helpful if the internal ring gear teeth 121A can be permitted to rotate along with and at the same speed as the rotatable cylinder 124.

FIGS. 10A and 10B illustrate one mechanism by which this may be accomplished. During the continuous centrifugal tube casting and die and/or roll deformation of the tube to some structural item (as I-beam), the ring gear teeth 121A are stationary (as is the rest of the support frame 121). Rolling contact with the spur gears 131 and 132 (attached to the rotating cylindrical frame 124) with internal ring gear 121A powers the pull-out rolls 112A and 112B of FIG. 5. If it is desired to stop the pull-out rolls, so that they will no longer withdraw the cast tube from the mold but still maintain the rotation of the mold and cylindrical frame so that centrifugal action is maintained, the ring gear 121A must be disengaged from the spur gears 131 and 132 or else allowed to rotate with and at the same speed as the cylindrical frame 124 to which the spur gears are attached. This latter method is accomplished as follows:

In FIGS. 10A and 10B, the always stationary (non-rotating) support frame 121 is attached to an inner support frame 121B by means of a multiplicity of brake shoes 250 attached to both sides of the frame 121 by pivots 252 (shown in FIG. 10A only). These brake shoes 250 are located at equal radial increments around the central point of the frame 121 and are forced into contact with a brake drum flange 254 (an extension of support frame part 121B) by double acting air pistons 256 which are rigidly attached to flange extensions 258 of the non-rotatable support frame 121. During the time that these brake shoes 250 are in contact with the brake drum flanges 254, the frames 121 and 121B as well as the ring gear teeth 121A are integral and non-rotating. When the action of the double acting piston 256 is reversed, the brake drum shoes 250 are disengaged from the brake drum flanges 254. In this instance, the resistance to deformation of the tube being processed brings the gear train mechanism (shown in FIG. 5) to a halt and effectively stops gears 131 and 132 from turning. The gear teeth of the now non-turning gears 131 and 132 lock with the ring gear teeth 121A and cause the support frame port 121B to rotate with the cylindrical frame 124 to which the spur gears 131 and 132 are attached. Support frame part 121B can rotate while support frame part 121 remains stationary due to a series of roller bearings 260 circumferentially and equally spaced between the roller bearing races 262 and 264 which are integral with support frame parts 121B and 121 respectively.

*Alternate casting method*

FIG. 12 illustrates how the first stage of my process, instead of utilizing one of the centrifugal casting procedures described above, may utilize a non-centrifugal method (such as the "Inverted Casting" technique wherein a tube is drawn vertically upwards from a static pool of molten metal 300, in a crucible 301, preferably of U-tube form (or a means of introducing molten metal into the bottom of a casting mold via a conduit of the same U-configuration), having at one end upwardly extending receiving mouth 302 into which molten metal can be poured from a spout 303, and having at its opposite end a mold throat 304 capped with a cooling collar 305 in which the tube 25 is solidified from the molten metal in throat 304. By use of suitable traction means 174, the tubular cast shell of metal 25 is drawn upwardly and collapsed inwardly into a double-walled longitudinal item of structure (depicted in FIGURE 12 as structural plate 115). The rolls 174 may collapse and, also, roll-weld the contiguous inner surfaces of the double-walled structure together while serving as the upwardly drawing traction means or the operations may be done sequentially by the various devices embodied by the teachings of this invention's disclosure. More than this, in the case of a tube collapsed to a double-walled flat plate 115, the plate may be bent to the horizontal by appropriate means for continued horizontal rolling into sheet and/or foil as is now done in the Hunter continuous casting process which converts molten aluminum to cast flat by using chilled opposed rotating rolls as the mold. As previously mentioned, the fact that the collapsing rolls 174 seals the tube 25 at the exiting end and the molten metal 300 seals the tube at the casting end (at the water-cooled mold 305) to produce an interior sealed cavity 306, can be taken advantage of to achieve a number of beneficial effects by varying the gas pressure within the cavity 306. Normally, solidifying metals release a considerable amount of gas (as hydrogen and/or carbon monoxide depending on the metal being cast) and, where this gas is trapped in such a sealed cavity 306, a high pressure will build up. For the purposes of releasing and controlling the pressure within the sealed cavity 306, I have introduced a refractory (gas-entrance and exit) tube 307 having one opening 308 in the sealed cavity (above the liquid level of the molten metal 300) and with the other opening exiting to the outside of the casting system through any available pressure controlling device (not shown) so that the gas pressure (and composition) within the sealed cavity can be varied as desired. By way of initiating the start-up of such a casting operation, the sealed cavity 306 within the starting blank can be purged of air with an inert or reducing gas and the pressure maintained at a desired level. Generally speaking, the gas pressure within the cavity are made to differ from the ambient atmospheric pressures by relatively small but advantageous amounts. When the gas pressure within the cavity is permitted to be above atmospheric level (due to initial introduction of inert gas or gases released within the cavity by the solidificaton of molten metal), a very considerable upward thrust on the tube 25 is achieved (for example, a pressure one pound greater than the external atmospheric pressure existing within the sealed cavity 306 of a 40 inch diameter tube 25 would create an upward thrust on the tube of $\pi R^2 \times 1$ pound, or $\pi \times 400 = 1260$ pounds). Such positive internal pressures can be utilized to thrust the tube upwardly (in which case, the traction or collapse formnig rolls 174 would be utilized to brake the upward thrust of the sealed tube 25 and regulate the exiting rate of the cast tube). More than this, light walled tubes are made more rigid by a positive internal pressure and the internal pressure aides in maintaining the tubular shape (helps to prevent sagging) prior to actual inward collapse by the rolls 174 (or other means). A positive internal pressure also helps to keep the hot pliable solidified shell of tube metal (within the mold 305) in an extended contact with the cooling mold walls and thus permits greater heat abstraction with attendant thickening of the tube walls or faster production as desired. Conversely, by creating a suction at end 309 of the vent 307, the pressure within the cavity 306 can be reduced below that of the surrounding atmosphere and has the advantage of aiding molten metal degasification and, also, aids the collapse of heavier cast tube walls.

It should be realized that the use of a positive or negative pressure within the sealed cavity 306 depends on the metal being cast to tube, the diameter and wall thickness of the tube and the rate of output. Either positive or negative pressures can be judiciously used to advantage depending on the circumstances as outlined. It should be equally apparent that such pressurization can be created by external gas pressures applied to the tube cavity 306 via exit end 309 of refractory tube 307.

The foregoing teachings are applicable to any other tube casting apparatus wherein the casting cavity is of a sealed configuration such as that shown in FIGURE 9 and the sealing of the tube casting cavity (214 of FIG. 9 and 306 of FIG. 12 as examples) is one of the important innovations of this disclosure and is so claimed.

FIG. 13 shows a mechanical means of preventing edge-splitting at the tight folded edges of the structures, formed by the practice of this invention, wherein the folded edges are mechanically hammered in such a manner that a surface compressive stress is created on the exterior surface of the fold. Such generated compressive stresses, along with the grain refinement resulting from the hot working of the tube metal, obviates any tendency towards edge-splitting.

In this method a multiplicity of hammers 320 are attached to the ends of leaf springs 321 which radiate from and are attached to a rotating shaft 322. These hammers peen a selected edge area 323 as the structure passes the peening wheel 322A. A series of such peening wheels (e.g. 324 and 325) are located along the length of the moving structure 110 so as to peen the entire outer edge of the fold prior to complete fold-back and roll-welding of the interior surfaces to each other. Such peening wheels are so positioned that the entire outer folded edge is hammered. It will be understood that the array of peening wheels is duplicated on both sides of the flattened tube 110, as indicated fragmentarily in the drawing.

It should be noted that whereas FIGS. 4 and 5 pertain to the rolling of tube to plate, plate is merely illustrative of one structural shape that can be fabricated by roll or die deformation of tube. All structural shapes (some of which are illustrated in FIG. 3) are fabricable by this conceived process of collapse deforming of tube to the desired cross-section with sufficient force to hot weld or otherwise join the interior surfaces of the original tube to each other.

The conventional means for making larger diameter pipes is to shape plate metal (as steel) into a cylindrical shape and then weld the seam to fabricate the tube. The plate used is expensive due to its having been formed from solid ingot or slab by sequential rolling in a large rolling mill. The additional cost of forming the plate into a cylinder and then welding the seam makes such tube an expensive item.

In the conceived invention, tube is a continuously cast relatively inexpensive item and is used as a starting item for the fabrication, of other structural shapes such as plate, I-beams, channels and the like.

This complete and novel reversal of the accepted method of manufacture of tubing is unique and results in great economies not only in the fabrication of the structural item but in the cost of capital equipment since much less powerful (heavy) and costly equipment is required to roll or die-deform such shapes from a relatively thin-walled tube.

There has been shown and described herein a novel means for providing structural shapes by collapsing the wall of a tube rather than forming the various shapes from deformed billets and slabs. Although the invention has been described and exemplified in conjunction with cast metal, it should be apparent that the teachings of the invention are equally applicable for casting any matter which is castable by heat transfer, and/or which is deformable under pressure. Further, it is appreciated that in light of the foregoing, those familiar with the art may make modifications and/or substitute equivalents without departing from the true spirit of the invention. Therefore, all such equivalents and/or modifications are deemed to fall within the scope of the invention as claimed in the appended claims.

The overall method and apparatus, whereby this invention is carried out in practice, permits a great saving in expense since the residual heat of the tube metal so cast and deformed can be utilized from start to finish. Also, lighter equipment, greatly reduced consumption of power, and the elimination of many costly processing steps accrues from the practice of deforming a hollow cast shell to a structural item.

I claim:

1. A method of forming longitudinal structural members of selected cross-sectional shape, comprising the following steps:
  (a) utilizing a body of heated cast tube, and maintaining it at a selected processing temperature;
  (b) collapsing the heated tube along its length into a longitudinal member of the selected cross-sectional shape; and
  (c) bringing selected opposed areas of the hot collapsed tube together in folded, double-wall structure with sufficient pressure to size the member to the desired final dimensions and to effect at least partial welding of the contiguous interior surfaces one to the other, whereby to form the selected structural shape.

2. The method defined in claim 1, including the initial step of casting the tube; and
  wherein said collapsing step is performed while the tube is maintained in a heated condition from the tube-forming step.

3. The method of forming longitudinal metal structural members of selected cross-sectional shape, comprising the following steps:
  (a) forming a body of heated metal into a tube;
  (b) collapsing the tube along its length; and
  (c) bringing selected opposed areas of the collapsed tube together in folded, double-wall structure to form the selected structural shape;
  (d) said collapsing step being performed while the tube is maintained in a heated condition from the tube-forming step;
  (e) and including the step of welding said opposed areas together to reinforce said double-wall structure.

4. The method defined in claim 3, wherein said steps of collapsing the tube and bringing said oposed areas together are performed by longitudinal rolling.

5. The method defined in claim 4, wherein said longitudinal rolling is performed while the interior of the tube is at a weldable temperature, and said welding is effected by bringing the heated opposed interior surfaces of the tube together under pressure while at said weldable temperature.

6. The method defined in claim 1,
  wherein said tube consists of a selected length of previously cast tubing; and
  wherein said tube is reheated to a suitable processing temperature preparatory to said collapsing step.

7. The method defined in claim 3, wherein said tube is formed by centrifugal casting, and wherein said steps of collapsing the tube and bringing said opposed areas thereof together are performed while the tube retains its heat of casting residual therein as it emerges from the casting operation, and is consequently in a soft malleable condition.

8. The method defined in claim 1, wherein said tube is formed by centrifugally casting it in a rotating mold; and wherein the steps of collapsing the tube and deforming it to a structural shape are performed by a deforming means which is rotated about the axis of the tube as it emerges from the mold, and continuing the rotation of the tube in step with the rotation of the mold while the tube is being thus deformed.

9. The method defined in claim 1, wherein said tube is formed by centrifugally casting it in a rotating mold; and wherein the steps of collapsing the tube and bringing its said opposed areas together are performed by longitudinally rolling the tube in a rolling mill as it emerges from the mold and rotating said mill about the axis of the tube and continuing the rotation of the tube during the rolling operation.

10. The method defined in claim 1, wherein said tube is formed by centrifugal casting, wherein the step of collapsing said tube is performed in a rolling mill, and including the step of reducing the thickness of the tube being cast in the mold when preparing for a shutdown so as to prepare on the end of said tube a relatively thin-walled starting blank which can be passed through said mill when cold upon subsequent start-up without overloading said mill.

11. An apparatus for forming longitudinal structural members of selected cross-sectional shape, comprising:
  a mold for casting a body of molten material into a tube;
  means for withdrawing the tube from said mold;
  means for collaping the withdrawn tube along its length into a longitudinal structural member of the selected cross-sectional shape;
  and seal means for controlling the pressure within the interior of said mold as the molten matter continuously solidifies therein.

12. An apparatus for continuously forming a longitudinal structural member of selected cross-sectional shape, comprising:
  a hollow tube-like mold having an interior surface and exterior surface and input and output ends disposed along a longitudinal axis of said mold;
  means for injecting molten matter into said mold through the input end thereof;
  means for cooling at least the exterior surface of said mold;
  rotating means for rotating said mold about its longitudinal axis whereby the molten matter is substantially evenly dispersed in said mold at the interior surface thereof as said matter is subjected to centrifugal forces, said molten matter solidifying into a tube by transferring heat to said means for cooling through said mold;
  rotatable means having a longitudinal axis of rotation aligned with the longitudinal axis of said mold, said rotatable means being disposed about the output end of said mold for rotationally and continuously extracting the solidified tube from said mold through the output end thereof; and
  deforming means rotatably coupled to said [rotatable] means for deforming said tube into a predetermined structural shape after said tube is substantially solidified.

13. The apparatus defined in claim 12 said deforming means including rotatable roll-forming means coupled to said rotatable mold for deforming the tube continuously solidifying in said mold and being extracted therefrom into a predetermined structural shape by inwardly collapsing the tube, whereby the peripheral dimension of said structural shape is substantially equal to the peripheral dimension of said tube.

14. The apparatus defined in claim 12 said deforming means including an ironing die assembly rotatable by said rotating means together with said rotating mold for continuously deforming said solidified tube extracted from said mold into a preselected structural shape.

15. A continuous method of centrifugal tube casting, comprising the following steps:
  (a) injecting molten casting material into an inlet of a rotating mold and causing it to assume the form of a tubular body against the inner wall of the mold in response to the rotation thereof and the centrifugal force thereby developed in said molten material;

(b) cooling the outer surface of said rotating molten body and thereby causing the outer area thereof to solidify into the form of a tube, a portion of said rotating body remaining liquid and in contact with said solidified tubular portion at a liquid-solid interface;

(c) applying traction to said solidified tube portion so as to draw it axially from an outlet of said mold in a continuous operation in which said liquid body portion follows said tube portion axially and is cooled so as to continue the development of said tube portion;

(d) adding molten casting material into said mold through said inlet to replace the material formed into said tube; and (e) shut-down and start-up steps of diminishing the supply of molten casting material at the mold inlet so as to form, as an integral extension of said tube, a tubular starting blank of lesser wall thickness than said tube, and (f) subsequently reinserting said starting blank into the mold, rotating the mold, injecting molten casting material into the mold inlet, and causing it to join integrally to the end of said starting blank.

16. A method of forming metal structural members of selected non-circular cross-section comprising the following steps:

(a) continuously casting a tube in a mold;

(b) withdrawing said tube axially from the mold while continuing said casting operation;

(c) deforming said tube while hot into the selected structural cross-section; and (d) adding molten casting material into said mold to replace the material formed into said tube.

17. The method defined in claim 16, wherein, in said casting step, said tube is shaped with a preform cross-section intermediate between cylindrical and the cross-section of the structural member to be formed.

18. The method defined in claim 16, wherein, in said deforming step, wall portions of said tube are collapsed together to form a double-wall structure in said member.

19. The method defined in claim 16, wherein, in said deforming step, wall portions of said tube are collapsed together to form a double-wall structure in said member; and wherein said deforming step includes an intermediate step in which a space is left between said collapsed wall portions so as to avoid binding thereof in dies employed in a final stage of said deforming in which said wall portions are brought into pressure contact with one another.

20. The method defined in claim 16, wherein, in said deforming step, wall portions of said tube are collapsed together to form a double-wall structure in said member; and including the further step of welding said wall portions together to reinforce said double-wall structure.

21. The method defined in claim 16, wherein said deforming step is performed, as the tube exits from the mold and white it remains in a heated condition, by slitting said tube helically to form a strip, drawing the strip tangentially from the circumference of the tube, and forming said strip longitudinally with any selected cross-section.

22. The method defined in claim 16, wherein said deforming step is performed by engaging the sides of the tube between laterally-opposed press dies.

23. The method defined in claim 16, wherein, in said deforming step, wall portions of said tube are collapsed together to form a double-wall structure in said member, and including the further step of peening the marginal folds joining said collapsed wall portions, to inhibit edge-splitting of said folds.

24. The method defined in claim 1, wherein the tube is maintained at a welding temperature and is subjected to collapsing pressure such that at least partial welding of the collapsed, contiguous interior surfaces is effected, thereby reinforcing a double-walled portion of the structural shape.

25. The method defined in claim 1, wherein the tube is maintained at a sufficiently high temperature and is subjected to collapsing pressure sufficient to effect at least partial welding of the collapsed, contiguous inteior surfaces;

and wherein the tube is reheated after casting, in order to maintain said temperature.

26. The method defined in claim 1, wherein the contiguous interior surfaces are bonded after the collapsing operation, said bonding being effected by a method selected from the group of operations including spot welding, plug welding and seam welding.

27. The method defined in claim 1, wherein the contiguous interior surfaces are bonded after the collapsing operation, said bonding being effected by a method selected from the group operations including brazing and soldering.

28. Apparatus for forming longitudinal structural members of selected cross-sectional shape such as channel, angle, T, I-beam, H-beam, rail, plate and sheet, comprising:

rotatable means for casting a body of molten material into a tube;

means for withdrawing the tube from said casting means;

means for collapsing the withdrawn tube along its length into a longitudinal member of the selected cross-sectional shape;

said collapsing means being rotatably coupled to said rotatable casting means, for deforming the tube as it is withdrawn from the casting means.

29. Apparatus as defined in claim 28, said collapsing means including rotatable roll-forming means coupled to said rotatable mold for deforming the tube continuously solidifying in said mold and being extracted therefrom into a predetermined structural shape by inwardly collapsing the tube, whereby the peripheral dimension of said structural shape is substantially equal to the peripheral dimension of said tube.

30. Apparatus as defined in claim 28, said collapsing means including an ironing die assembly rotatable by said rotating means together with said rotating mold for continuously deforming said solidified tube extracted from said mold into a pre-selected structural shape.

References Cited

UNITED STATES PATENTS

| | | | |
|---|---|---|---|
| 1,908,168 | 5/1933 | Naugle et al. | 29—528 |
| 2,453,165 | 11/1948 | Thornburgh | 113—120 |
| 2,752,648 | 7/1956 | Robert | 164—263 |
| 2,827,944 | 3/1958 | Grossu | 72—181 |
| 2,940,143 | 6/1960 | Baubersy et al. | 164—84 |
| 2,963,758 | 12/1960 | Pester et al. | 164—49 |
| 3,193,889 | 7/1965 | Lane et al. | 164—48 |

FOREIGN PATENTS 22,708　11/1896　Great Britain.

JOHN F. CAMPBELL, *Primary Examiner.*

P. M. COHEN, *Assistant Examiner.*

U.S. Cl. X.R.

29—33, 527.7; 72—181; 113—120; 164—70, 83, 84, 263